(12) United States Patent
Levine

(10) Patent No.: US 6,557,710 B1
(45) Date of Patent: May 6, 2003

(54) MEDIA DISC HOLDER

(75) Inventor: Jonathan L. Levine, New City, NY (US)

(73) Assignee: Coastal Sales Associates, Inc., Chester, NY (US)

( * ) Notice: Subject to any disclaimer, the term of this patent is extended or adjusted under 35 U.S.C. 154(b) by 0 days.

(21) Appl. No.: 09/999,750

(22) Filed: Oct. 31, 2001

(51) Int. Cl.⁷ .............................................. A47G 29/00
(52) U.S. Cl. ....................... 211/40; 211/40; 211/41.12

(56) References Cited

U.S. PATENT DOCUMENTS

| | | | |
|---|---|---|---|
| 4,255,888 A | 3/1981 | Bastogne | |
| 4,273,416 A | 6/1981 | Blum | |
| 4,302,032 A | 11/1981 | Randall et al. | |
| 4,580,685 A * | 4/1986 | Jorquez | 211/131.1 |
| 4,655,345 A | 4/1987 | Drake et al. | |
| 5,341,943 A * | 8/1994 | Fraser | 206/309 |
| 5,460,275 A | 10/1995 | Ladwig | |
| 5,544,741 A | 8/1996 | Fantone et al. | |
| 5,683,153 A | 11/1997 | Ohta | |
| 5,685,439 A | 11/1997 | Luenser | |
| 5,758,780 A | 6/1998 | Baumgarten | |
| D405,309 S | 2/1999 | Mok | |
| 6,215,264 B1 * | 4/2001 | Ma | 206/308.1 |

* cited by examiner

Primary Examiner—Alvin Chin-Shue
Assistant Examiner—Sarah Purol
(74) Attorney, Agent, or Firm—Schmeiser, Olsen & Watts LLP

(57) ABSTRACT

A container for media disc cases having a plurality of slots so as to present the edges of the cases in a stacked format. A magnifying bar is slidably mounted on the container for positioning in front of the case edges to aid the user in reading the indicia thereon. A light located within the container focuses a beam along the edge surfaces of the disc cases to aid in reading the indicia on the cases through the magnifying bar.

6 Claims, 2 Drawing Sheets

MEDIA DISC HOLDER

FIELD OF THE INVENTION

Generally this invention relates to a holder for media discs. More specifically, the holder is a multi-slotted container for holding CDs or DVDs, which includes a magnifier.

BACKGROUND OF THE INVENTION

With the advent of numerous methods for holding media, including older items such as cassette players and video tapes and especially given newer media holders such as compact discs (CDs) and digital video discs (DVDs), storage of these various cassettes, tapes or discs have become an issue. Prior to such forms of media holders, items were generally kept in books including either the written word or photo albums. While space was sometimes difficult, the use of bookshelves served well in combination with books where titles were clearly displayed on the book spines to allow for easy referencing and locating of the desired item.

As these various media holders have developed, they also decreased in size which, while being a significant benefit relative to the area required for storage, can cause difficulties relative to indexing and easily locating a particular item. Due to the decreasing size of the various media holders, there has been a corresponding decrease in the size of the print identifying the particular item. Due to the fact that these items are generally stored in parallel, the face or larger flat surface of the storage container, which contains clearly identifying names and graphics, is generally not visible. Instead, the printing is along the edge of the disc holder, which edge is displayed and must be read to identify the item. The difficulty in reading identifying material on the edge of the disc holder is sometimes exacerbated as these containers have primarily evolved into clear plastic containers with inserts that are put inside and read through the clear plastic. Depending on the lighting in a particular area, it is not uncommon for there to be a reflection or glare off of these plastic containers, thus rendering the title or description virtually unreadable.

These problems may be further exacerbated depending upon the location where the particular holder is placed. Clearly, locating the holder at eye level leads to the greatest ease in reading the side of the sleeve inserts. However, it is more common for holders, especially free-standing ones, to be placed on the ground or some other location that is well below eye level. This results in the user either trying to read the side sleeve at a significant angle or requires the user to bend or squat in order to try to achieve a more level view in order to read the description on the side sleeve.

SUMMARY OF THE INVENTION

The item which is the subject of this patent application is a holder for media discs such as CDs or DVDs. The invention, however, could serve as a holder for any item in a stacked configuration where their is a need to magnify a portion of the item in order to more easily identify it. References in this application to any particular type of media holder is meant to include all types of media holders including but not limited to CDs and DVDs. In the subject invention, the media disc cases are inserted into the container so that the identifying indicia faces outwardly from the container. A magnifier movably connected to the container may be positioned over an edge side of a select disc case so as to magnify the case identifying indicia for easy reading.

The container may also have a light, which is positioned to direct its beam across the side edges of the media disc cases on which the identifying indicia is displayed. This further enhances the ability of one to read the indicia with the magnifying glass where darkness is an issue. The position of the light will also tend to decrease any glare or reflection from other light in the area.

Further understanding of the subject product and the invention as contained therein may be understood through consideration of the various product descriptions and the claims contained herein.

BRIEF DESCRIPTION OF THE DRAWINGS

The preferred embodiments of the present invention will hereinafter be described in conjunction with the appended drawings, wherein like designations denote like elements, and.

DETAILED DESCRIPTION OF THE INVENTION

Figure 1:
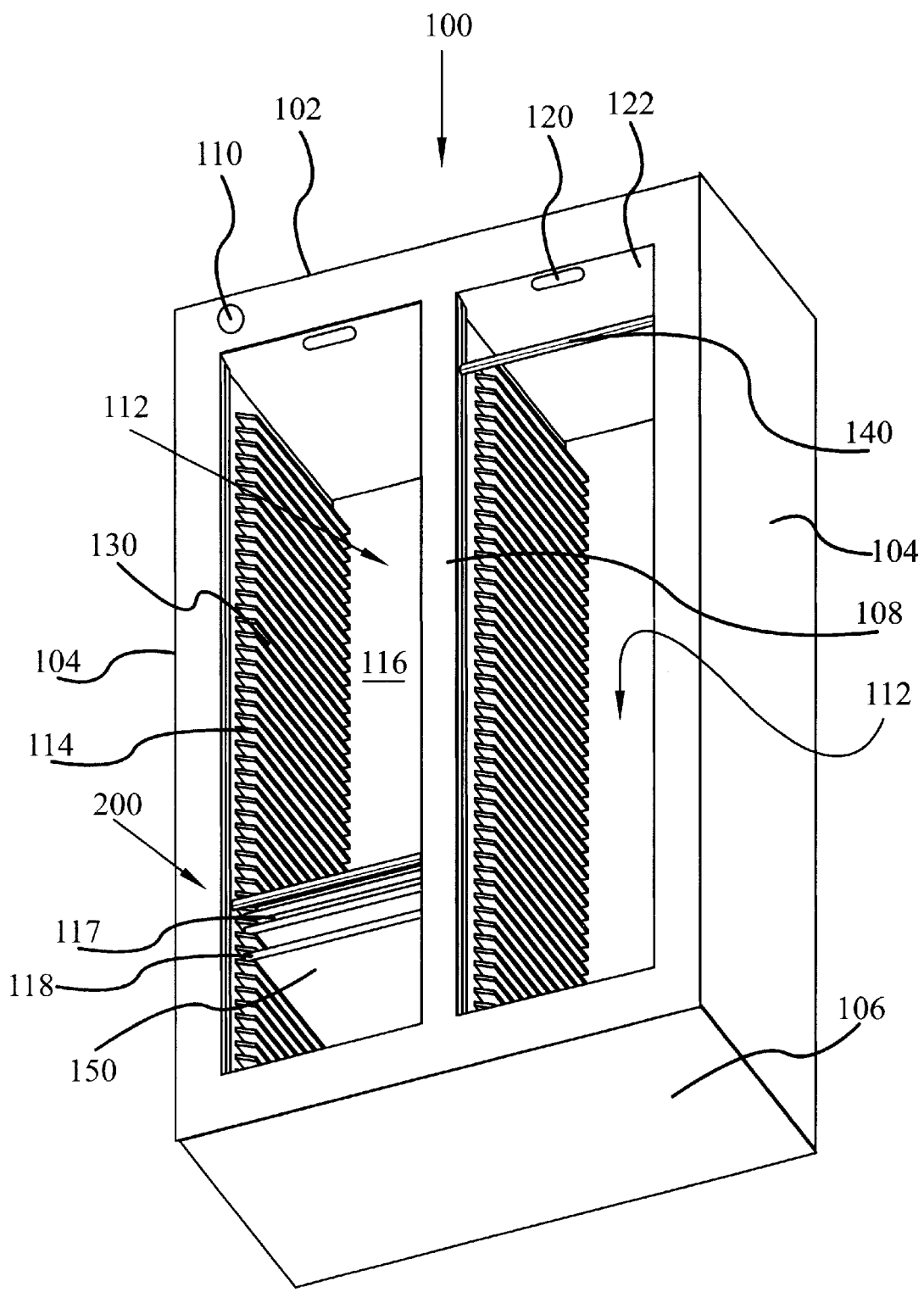
FIG. 1 is a perspective view of the media holder.

With reference to FIG. 1, a container 100 serves as a holder for media disc cases 150. The container 100 has a top surface 102, sides 104 and a bottom 106.

In one embodiment, a center support 108 divides the container into two elongate openings 112 for holding the media cases 150 in a stacked configuration. Each elongate opening 112 has a plurality of fins 114 located in alignment on opposing sides of the opening and thereby defining a plurality of slots 130 into which the media cases may be placed.

When the cases are inserted all the way into a slot, they contact a stop which, in one embodiment, may be the back wall 116 of the container 100. Any other stop which would prevent a disc case from sliding through a slot would be suitable, including but not limited to a cross piece at the rear of each fin. Since media cases are generally of a standard size, the insertion of these standard sized media cases all the way into their respective slots will form a perpendicular face 117 formed by the edge surfaces 118 of the cases 150.

A magnifier bar 140 is slidably mounted to the container 100 so as to traverse an elongate opening 112. The ends 123 of the magnifier 140 are inserted into opposing channels 145 which travel substantially the entire length of the elongate opening 112 so that the magnifier bar 140 may slide along the face 117 formed by the edge surfaces 118. This enables the user to magnify whatever indicia may exist on the edge surfaces 118 and more easily identify the relevant CD case.

It should be appreciated that the magnifier bar 140 may be of any preferred width in order to cover one or more discs. Also, the magnifier bar 140 may be configured so as to enhance the user's ability to look through the magnifier at an angle other that a straight on view and still be able to read the edge of the CD over which the magnifier is placed. While the particular shape of the magnifier bar, such as half moon or stepped configuration, could assist non-linear viewing, it is also possible to fashion the magnifying bar with some reflective material so that the user could be looking non-linearly and still read the edge of the case over which the magnifying bar is placed. This could be accomplished by using reflective material, which acts as a one-way mirror, allowing the user to look through the non-reflective surface and read the indicia off of the reflective surface. In such an embodiment, two mirrors may be used to keep the text in a readable orientation.

It should also be appreciated that the container 100 could be made so that the elongate opening 112, which the magnifying bar 140 traverses, is not the point of insertion or removal of the CDs. The point of removal could either be through a side 104 or through the back wall 116. This would enable the user to remove the CD without having to move the magnifying bar.

Similarly, mirrors could be used on the magnifying bar or the magnifying bar could be angled so that the CD being read is the CD immediately below or above the magnifying bar thus also allowing the CD to be removed without moving the bar.

Figure 2:
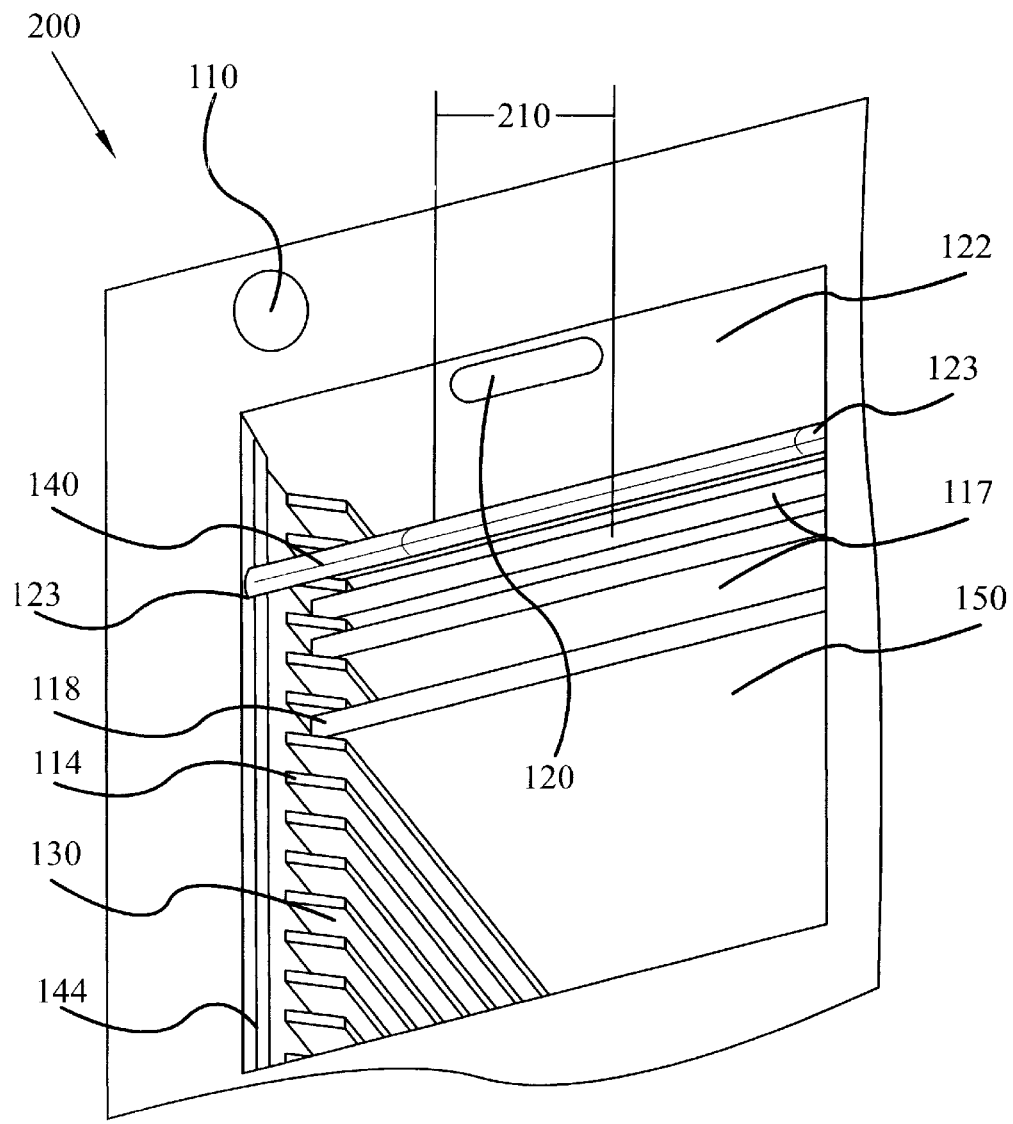
FIG. 2 is an enlarged view, also in perspective, showing a top portion of the media container.

The magnifying bar traverses the elongate openings 112 by sliding along the channels 145 in a first plane. When a plurality of same size media disc cases are inserted all the way into their respective slots 130, they form a face 117 of edge surfaces 118 which may be considered a third plane. A second plane or space 210, as shown in FIG. 2 lies between the first and third planes. Located on the inside top surface 122 of the elongated opening 112 is a light 120. A button 110 is located in the front surface 200 of the container to turn the light 120 on or off. The button used is of any type commonly used as a light switch, which is activated or deactivated by pushing the button inwardly. The light is located mostly within the second plane 210 so as to focus the beam emanating therefrom along the second plane 210 thereby lighting the edge surfaces 118. The light 120 not only illuminates any darkened surface but also assists in removing any glare that would normally exist on the edge surface due to other lighting thus enhancing the visibility of any indicia on the edge of the media disc case through the magnifier bar 140. It should be appreciated that light 120 may be recessed into the inside top surface 122, shrouded, or inset to be substantially flush with the surface 122 such that a minimal amount of light is cast outwardly toward the viewer, which could interfere with reading the disc indicia.

While the invention has been particularly shown and described with reference to selected embodiments thereof, it will be readily understood by one of ordinary skill in the art that, limited only by the appended claims, various changes in form and details may be made therein without departing from the spirit and scope of the invention.

What is claimed is:

1. A holder for media disc cases comprising:

a container having a plurality of sides, one of said sides having an elongate opening and a plurality of slots for receiving media disc cases, said container being configured to allow for the orientation of cases such that information on an edge side of a case is discernable while the cases are in the container; and a magnifier slidably mounted on said container so as to traverse the elongate opening and thereby magnify the case information on the edge side of the cases when the cases are in the container.

2. The invention of claim 1, wherein each slot is adapted to receive at least one case.

3. The invention of claim 1, further comprising a light mounted on the container for illuminating the information on a case while the case is in the container.

4. The invention of claim 3, wherein said magnifier slides along the container in a first plane; and a second plane is formed between the first plane and a face formed by the media cases when they are in the container, said light mounted on the container so that a beam emitted from the light is directed primarily along the second plane.

5. The invention of claim 4, wherein said container has an inner top surface above the elongate opening, said light being located in the inner top surface primarily in the second plane.

6. The invention of claim 5, wherein the light is inset into the inner top surface and does not protrude substantially beyond said inner top surface.

\* \* \* \* \*